(12) United States Patent
Yokoyama et al.

(10) Patent No.: US 9,930,249 B2
(45) Date of Patent: Mar. 27, 2018

(54) CAMERA APPARATUS

(71) Applicant: PANASONIC INTELLECTUAL PROPERTY MANAGEMENT CO., LTD., Osaka (JP)

(72) Inventors: Takamasa Yokoyama, Fukuoka (JP);
Yoichiro Yamagi, Fukuoka (JP);
Hironori Kuribayashi, Fukuoka (JP);
Yoshihito Urashima, Fukuoka (JP);
Jyouji Wada, Kanagawa (JP);
Shinichiro Okamura, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/421,767

(22) Filed: Feb. 1, 2017

(65) Prior Publication Data

US 2017/0257558 A1 Sep. 7, 2017

(30) Foreign Application Priority Data

Mar. 7, 2016 (JP) ................................ 2016-043877

(51) Int. Cl.
*H04N 5/232* (2006.01)
*H04N 5/225* (2006.01)
*G02B 27/00* (2006.01)

(52) U.S. Cl.
CPC ..... *H04N 5/23216* (2013.01); *G02B 27/0006* (2013.01); *H04N 5/2252* (2013.01); *H04N 5/23296* (2013.01)

(58) Field of Classification Search
CPC .... H04N 5/225; H04N 5/232; H04N 5/23216; H04N 5/2251–5/2254; H04N 5/23203; H04N 5/23206; H04N 5/23238; G08B 13/1963; G08B 13/19691; G08B 13/19617

See application file for complete search history.

(56) References Cited

U.S. PATENT DOCUMENTS

| 6,714,236 B1* | 3/2004 | Wada | G08B 13/1963 348/152 |
| 6,867,798 B1* | 3/2005 | Wada | H04N 7/183 348/143 |
| 6,977,678 B1* | 12/2005 | Wada | G08B 13/1963 348/143 |

(Continued)

FOREIGN PATENT DOCUMENTS

JP 2011-049967 3/2011

*Primary Examiner* — Kelly L Jerabek
(74) *Attorney, Agent, or Firm* — Greenblum & Bernstein, P.L.C.

(57) ABSTRACT

A camera apparatus includes a pan tilt drive device; a pan controller that performs rotation angle control on a pan motor which is provided in the pan tilt drive device; a tilt controller that performs rotation angle control on a tilt motor which is provided in the pan tilt drive device; a mechanical endpoint detection sensor that outputs a mechanical endpoint of a physical rotation direction of the pan tilt drive device; a storage that stores a turning range for each installation posture as a turning range angle from the mechanical endpoint; and a CPU that sends out a start endpoint angle and a terminal endpoint angle of the turning range angle which is read from the storage according to the installation posture to the pan controller and the tilt controller.

4 Claims, 11 Drawing Sheets

(56) References Cited

U.S. PATENT DOCUMENTS

| | | | |
|---|---|---|---|
| 8,827,578 B2 | 9/2014 | Jikihara et al. | |
| 9,055,205 B2* | 6/2015 | Ono | H04N 5/225 |
| 2005/0285950 A1* | 12/2005 | Oya | G01S 3/7864 |
| | | | 348/211.4 |
| 2009/0269048 A1* | 10/2009 | Suzuki | G03B 9/06 |
| | | | 396/510 |
| 2011/0096164 A1* | 4/2011 | Mori | G02B 7/003 |
| | | | 348/143 |
| 2013/0272690 A1* | 10/2013 | Aoki | G03B 7/095 |
| | | | 396/257 |
| 2014/0152815 A1* | 6/2014 | Huang | H04N 21/4542 |
| | | | 348/143 |
| 2017/0150031 A1* | 5/2017 | Oshima | H04N 5/23203 |

* cited by examiner

CAMERA APPARATUS

BACKGROUND

1. Technical Field

The present disclosure relates to a camera apparatus which is capable of rotating in a pan direction and a tilt direction.

2. Description of the Related Art

There is a camera apparatus that includes a pan tilt driver which is capable of rotating in a pan direction and a tilt direction, and thus it is possible to image a desired direction by causing a camera main body to perform pan rotation and tilt rotation. In addition, there is a camera apparatus that includes a preset function of storing an imaging direction which is set by a user and causing the camera main body to automatically face the direction.

For example, an imaging apparatus unit of Patent Document 1 is known as a related art relevant to the preset function. An auto-preset mode is mounted on the imaging apparatus unit of Patent Document 1. The auto-preset mode is a function of fixing a monitoring camera to a prescribed position, setting a plurality of imaging directions by a user in order to image a subject which is positioned in a desired direction, and imaging and switching the subject which is positioned in the desired direction in an arbitrary order, which is set by the user, for a few seconds. The imaging apparatus unit corrects position deviation by measuring a prescribed time while processing the auto-preset mode, determining whether or not the position deviation occurs after prescribed time elapses, and performing an initial operation in a case where the position deviation occurs.

However, for example, in a configuration of a Japanese Patent Unexamined Publication No. 2011-49967, a posture of the imaging apparatus unit is a single (in other words, fixed to a prescribed position), and thus it is difficult to change to another posture, that is, it is difficult to take a plurality of postures while performing an operation. Therefore, in the imaging apparatus unit (specifically, the monitoring camera) of Patent Document 1, an installation posture is not changed, for example, from upright to suspension. If the change is performed, a pan tilt drive device operates at a preset angle acquired before the posture is changed and the main body of the monitoring camera does not face an original preset position. Therefore, there is a case where light from outside, such as light of sun, is incident into a lens, with the result that it is difficult to perform proper imaging, and thus it is difficult to image the subject in the user's desired direction, thereby being inconvenient.

SUMMARY

The present disclosure is provided in view of the above situation, and an object of the present disclosure is to provide a camera apparatus that detects an original point for determining a turning range in a case where a housing is rotated according to a posture of an installed housing, and automatically switches the turning range capable of shielding incidence of light from outside, such as light of sun, based on the original point, thereby improving user convenience.

The present disclosure provides a camera apparatus including: a pan rotation driver that is supported by a housing main body, and is configured to perform pan rotation by a pan motor; a tilt rotation driver that is configured to include a capture, is supported by the pan rotation driver through an arm, and is configured to perform tilt rotation by a tilt motor; a pan controller that controls a pan rotation angle of the pan rotation driver; a tilt controller that controls a tilt rotation angle of the tilt rotation driver; a posture detection sensor that detects and outputs a parameter which indicates a posture of the tilt rotation driver; an endpoint detection sensor that detects and outputs an endpoint of a physical rotation direction of the tilt rotation driver; a storage that stores a turning range in a tilt rotation direction for each posture as an angle which indicates the turning range from the endpoint; and a controller that controls the tilt rotation angle by sending out a start endpoint angle and a terminal endpoint angle of the angle, which indicates the turning range stored in the storage, to the tilt controller according to the parameter detected by the posture detection sensor.

According to the present disclosure, the turning range in a case where the housing is rotated is determined according to the posture of the installed housing, the turning range is automatically switched, and thus it is possible to improve user convenience.

DETAILED DESCRIPTION

Hereinafter, an exemplary embodiment (hereinafter, referred to as "the exemplary embodiment") in which a camera apparatus according to the present disclosure is disclosed in detail will be appropriately described in detail with reference to accompanying drawings. However, there is a case where unnecessarily detailed description is omitted. For example, there is a case where detailed description of already well-known information or duplicated description of substantially the same configuration is omitted. The reason for this is to avoid description below from being unnecessarily redundant and to make those skilled in the art easily understand. Meanwhile, the accompanying drawings and description below are provided to make those skilled in the art sufficiently understand the present disclosure, and it is not intended to limit a subject disclosed in claims by the accompanying drawings and description below. In the exemplary embodiment below, a monitoring camera will be described as an example of the camera apparatus according to the present disclosure.

Figure 1:
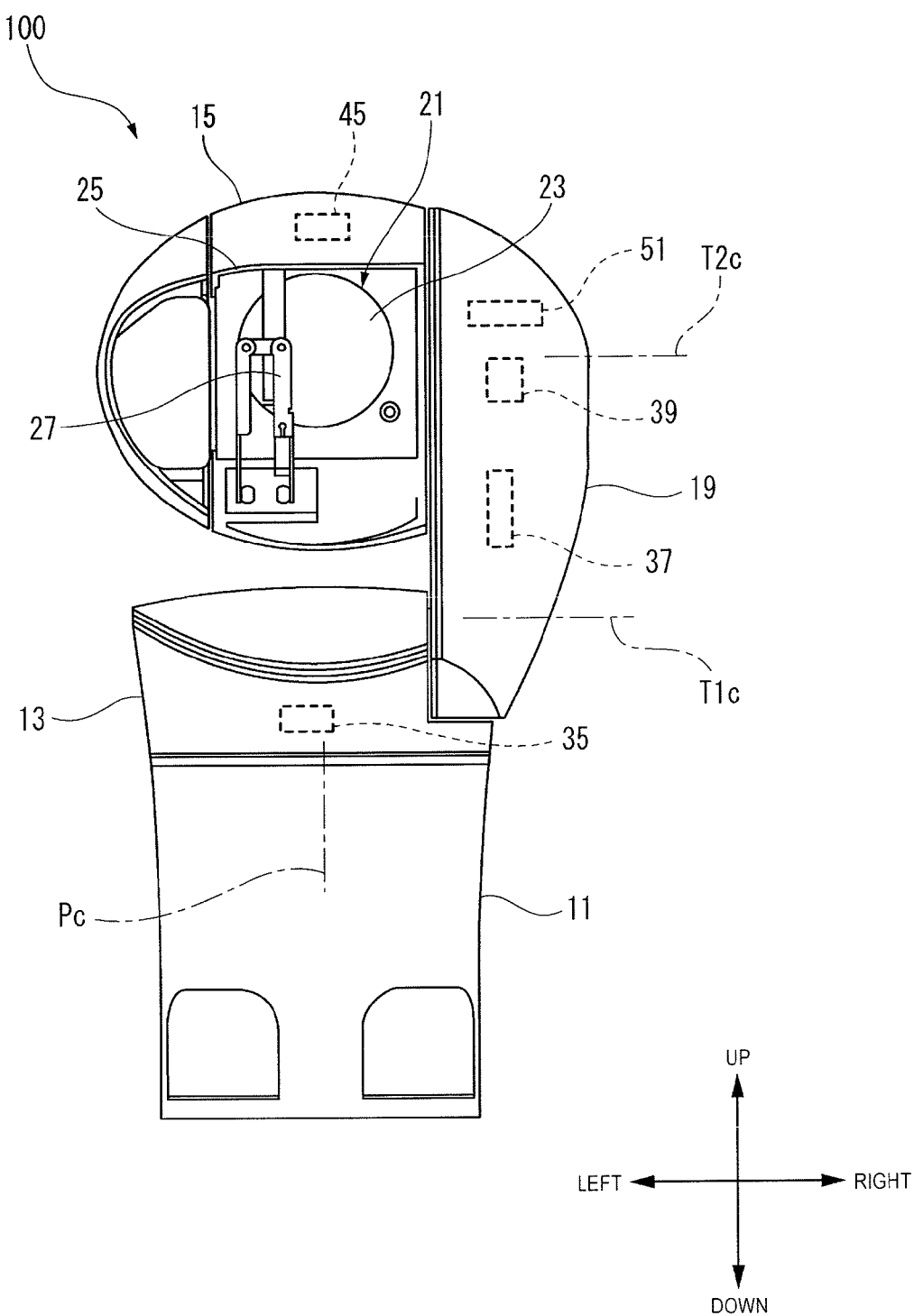
FIG. 1 is a front view illustrating a monitoring camera according to an exemplary embodiment.

FIG. 1 is a front view illustrating monitoring camera 100 according to the exemplary embodiment. In the exemplary embodiment, up and down and right and left directions follow arrow directions illustrated in FIG. 1, and front and back directions follow inside and outside directions of FIG. 1.

Monitoring camera 100 according to the exemplary embodiment includes camera base 11, pan housing 13, and tilt housing 15. Camera base 11 has a bottom surface which is a clamp surface. Camera base 11 is formed in an approximately cylindrical shape, and has the clamp surface which is fixed to a member to be fixed (for example, installation pole 17) by a fastener such as a bolt.

Arm 19 is attached to pan housing 13. Pan housing 13 is supported to freely perform pan rotation around pan rotation center Pc on an upper surface of camera base 11. Pan rotation center Pc coincides with a shaft line of camera base 11. Pan housing 13 supports a base end of one arm 19 on one side. That is, arm 19 performs pan rotation integrally with pan housing 13.

Pan housing 13 as an example of a pan rotation driver is supported by camera base 11 as a housing main body, and supports the base end of arm 19 to freely rotate around first tilt rotation center T1c which is separated from pan rotation center Pc and crosses pan rotation center Pc at right angles. That is, arm 19 is capable of tilting around first tilt rotation center T1c.

Arm 19 rises from pan housing 13 and supports tilt housing 15 at a tip.

Tilt housing 15 as an example of a tilt rotation driver is formed in an approximately spherical shape. Tilt housing 15 has the spherical shape in which a part is cut. A tip of arm 19 is disposed in the cut part. Tilt housing 15 is supported to freely perform tilt rotation around second tilt rotation center T2c, in which one end of a diameter direction has the same direction as first tilt rotation center T1c, at the tip of arm 19.

Tilt housing 15 is separated upward from pan housing 13 and is supported by arm 19. That is, tilt housing 15 is capable of performing tilt rotation around two rotation centers of first tilt rotation center T1c and second tilt rotation center T2c at upper and lower ends of the arm. Accordingly, tilt housing 15 is capable of projecting (moving to a direction which is separated from pan rotation center Pc) from pan housing 13. That is, a forward bending posture is possible.

Tilt housing 15 accommodates camera main body 21 as an example of a capture inside. Camera main body 21 is disposed such that an optical central axis of a lens takes along a direction which crosses second tilt rotation center T2c. The lens of camera main body 21 is covered with front cover 23 which is provided in tilt housing 15.

Pent-roof 25 is provided in tilt housing 15. Pent-roof 25 prevents light of sun from being incident into front cover 23. In addition, in tilt housing 15, wiper 27 is provided to freely perform rotation drive. Wiper 27 is rotated back and forth by a wiper motor, and removes dust, which is attached to a surface of front cover 23, using a wiping member, such as a rubber, which is provided on a rotation tip side.

Monitoring camera 100 includes a pan rotator between camera base 11 and pan housing 13. In addition, a first tilt rotator is provided between pan housing 13 and arm 19, and a second tilt rotator is provided between arm 19 and tilt housing 15. Transmission of imaging data and motor control signal data in the pan rotator, the first tilt rotator, and the second tilt rotator is performed through contactless Power Line Communication (PLC) using, for example, an antenna.

In addition, in monitoring camera 100, transmission of electric power in the pan rotator is performed by, for example, a slip ring, and transmission of electric power in the first tilt rotator and the second tilt rotator is performed by, for example, a twist line.

In monitoring camera 100, the pan rotator, the first tilt rotator, and the second tilt rotator have a watertight structure. The pan rotator, the first tilt rotator, and the second tilt rotator form a waterproof structure in such a way that a gap between a shaft and a shaft bearing is blocked by a waterproof seal material which is connected to both the shaft and the shaft bearing. Accordingly, it is possible to use monitoring camera 100 outside without being covered with a domed cover.

In monitoring camera 100, each of the pan rotator, the first tilt rotator, and the second tilt rotator includes a rotation transmission mechanism which engages a worm on a drive side and a worm wheel on a driven side. Accordingly, rotation from the worm wheel due to external force is prevented by an engaged worm. That is, a self-lock mechanism is equipped, and thus it is possible to prevent a monitoring direction from being changed in a case where pan housing 13, arm 19, and tilt housing 15 are rotated by external force such as wind pressure.

Figure 2:
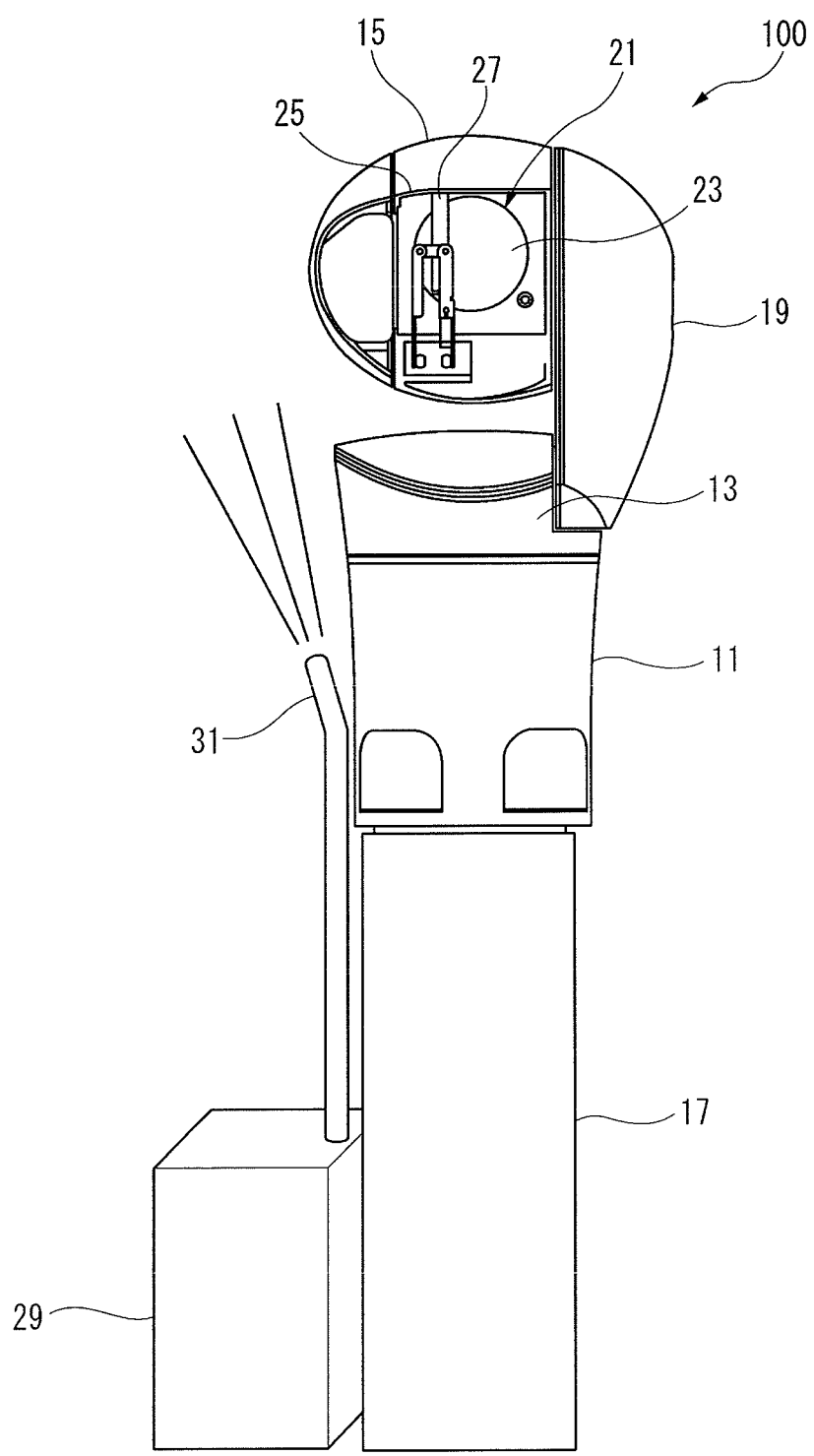
FIG. 2 is a front view illustrating the monitoring camera of FIG. 1 together with annexed washing water injection device.

FIG. 2 is a front view illustrating monitoring camera 100 of FIG. 1 together with annexed washing water injection device 29. It is possible to attach washing water injection device 29 (washer) to monitoring camera 100 according to the exemplary embodiment. In a case where monitoring camera 100 has an upright installation posture, washing water injection device 29 is attached to, for example, installation pole 17. Washing water injection device 29 includes injection nozzle 31 that injects washing water. Injection nozzle 31 extends along installation pole 17, and injects washing water upward in the vicinity of camera base 11. Monitoring camera 100 performs pan tilt drive such that front cover 23 of camera main body 21 is disposed in a washing water injection range.

Figure 3:
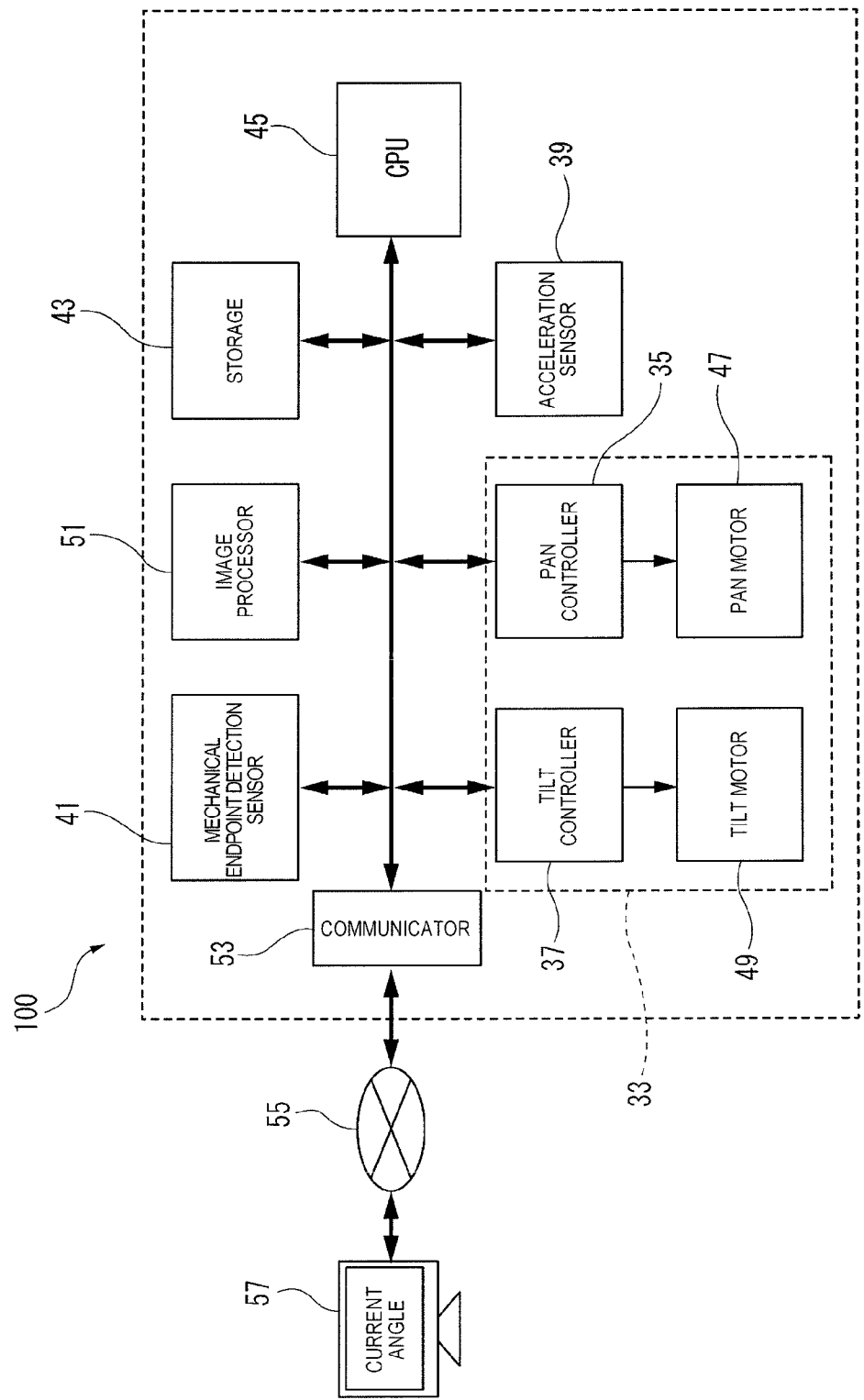
FIG. 3 is a block diagram illustrating an example of an internal configuration relevant to a control system of the monitoring camera illustrated in FIG. 1.

FIG. 3 is a block diagram illustrating an example of an internal configuration relevant to a control system of monitoring camera 100 illustrated in FIG. 1. Monitoring camera 100 according to the exemplary embodiment includes pan (PAN) controller 35, pan (PAN) motor 47, tilt (TILT) controller 37, tilt (TILT) motor 49, triaxial acceleration sensor 39, mechanical endpoint detection sensor 41, storage 43, Central Processing Unit (CPU) 45, image processor 51, and communicator 53. Meanwhile, CPU 45 may be replaced by a processor such as a Micro Processing Unit (MPU) or a Digital Signal Processor (DSP).

Pan motor 47, pan controller 35, tilt motor 49, and tilt controller 37 form pan tilt drive device 33. In other words, pan tilt drive device 33 causes pan housing 13 to perform pan rotation by pan motor 47, and further causes tilt housing 15 to perform tilt rotation by tilt motor 49. In addition, pan tilt drive device 33 includes the pan rotator, the first tilt rotator, and the second tilt rotator that include a gear group which converts rotation, performed by pan motor 47 and tilt motor 49, into rotation operations of pan housing 13, arm 19, and tilt housing 15.

Pan controller 35 controls a rotation angle of pan motor 47. The rotation angle is controlled in such a way that, for example, a stepping motor is used for pan motor 47. Pan controller 35 controls the rotation angle of pan motor 47 using pulse information.

Tilt controller 37 controls a rotation angle of tilt motor 49. The rotation angle is controlled in such a way that, for example, the stepping motor is used for tilt motor 49. Tilt controller 37 controls the rotation angle of tilt motor 49 using pulse information. Meanwhile, in the exemplary embodiment, a total of two tilt motors 49 are provided in the first tilt rotator and the second tilt rotator, respectively. In the block diagram of FIG. 3, two tilt motors 49 are abbreviated by being combined into one.

Triaxial acceleration sensor 39 as an example of a posture detection sensor outputs parameters (for example, respective accelerations of XY axis directions, which define a horizontal plane, and a Z axis direction which is perpendicular to the XY plane) that indicate the installation posture (in other words, rotation angles of pan housing 13 and tilt housing 15) of monitoring camera 100. Triaxial acceleration sensor 39 is provided in arm 19. Accordingly, CPU 45 is capable of detecting whether the installation posture of monitoring camera 100 is in, for example, an upright status, a forward bending status, or a suspension status based on the output of triaxial acceleration sensor 39. Triaxial acceleration sensor 39 may use, for example, any one of a semiconductor type using semiconductor piezoresistance effect and a mechanical type which switches between a movable contact and a fixed contact using a rotation mass.

Mechanical endpoint detection sensor 41 as an example of the endpoint detection sensor detects and outputs a mechanical endpoint of a physical rotation direction of pan tilt drive device 33 (for example, tilt housing 15 as the example of the tilt rotation driver). Mechanical endpoint detection sensor 41 is provided over, for example, between pan housing 13 and arm 19 and between arm 19 and tilt housing 15. It is possible to use mechanical endpoint detection sensor 41 as, for example, a limit switch which is provided between a rotation side and a fixed side. In this case, in mechanical endpoint detection sensor 41, in a case where the rotation side reaches rotation limit, a contactor of the limit switch operates and it is possible to output mechanical endpoint detection.

Storage 43 stores a turning range for each installation posture of monitoring camera 100 (for example, a turning range of a tilt rotation direction for each posture of tilt housing 15 as the example of the tilt rotation driver) as an angle (turning range angle) which indicates the turning range from the mechanical endpoint. In addition, storage 43 stores mask range angle information of a privacy mask in order not to display preset information, which is set by the user and indicates angle information of a predetermined direction viewed from the monitoring camera 100, and a part of image data which is acquired through imaging. CPU 45 appropriately reads the pieces of information which are stored in storage 43.

CPU 45 as an example of the controller determines the installation posture of monitoring camera 100 according to the output of the triaxial acceleration sensor 39. CPU 45 performs an original point detection process in a case where monitoring camera 100 is driven (that is, in a case where power is turned on), an angle coordinate changing process (that is, offset of a predetermined amount of angle coordinates according to the installation posture), and various processes, such as function or performance restriction for each tilting status and display of absolute position information to be returned to a controller side according to the determined installation posture.

CPU 45 changes angle coordinates of various processes according to the installation posture. That is, CPU 45 offsets a predetermined amount of angle coordinates, which are necessary when the various processes are performed, according to the installation posture which is detected through output from triaxial acceleration sensor 39. The predetermined amount which is offset is different according to the installation posture. A process, in which CPU 45 changes (offsets) the angle information, is performed to, for example, change a movable range in a case of tilt rotation (that is, offsets the movable range such that pent-roof 25 becomes top), and to change the angle coordinates (for example, the preset information and mask range angle information of the privacy mask) according to absolute position designation, the angle information acquired when a tilt flip operation is performed, and a position (that is, angle information which indicates a direction which faces the nozzle) acquired when washer injection is performed.

Image processor 51 performs a predetermined signal process on imaging data (that is, image data) that is imaged in the imaging device (not illustrated in the drawing) which can be formed of a Charge Coupled Device (CCD) or a Complementary Metal Oxide Semiconductor (CMOS) provided in camera main body 21.

Communicator 53 connects between controller 57, which is an external device connected through network 55, and monitoring camera 100, and performs wired communication or wireless communication. Network 55 is formed using a wired network (for example, Local Area Network (LAN)) or a wireless network (for example, wireless LAN). Communicator 53 transmits imaging data from image processor 51 to controller 57 or receives various control signals from controller 57.

Subsequently, an operation of monitoring camera 100 will be described.

[A. Movement of Original Point Detection when being Driven]

Figure 4:
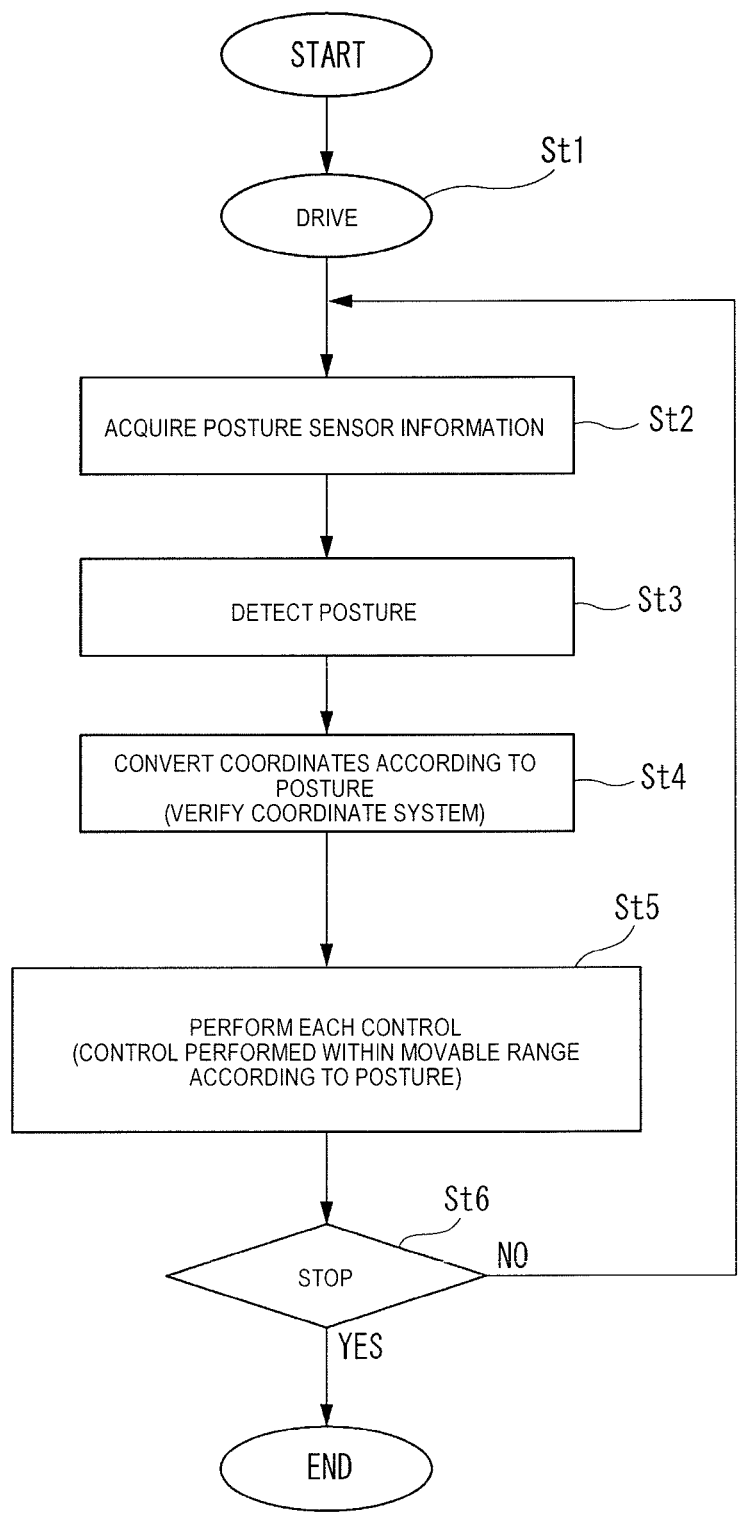
FIG. 4 is a flowchart illustrating an example of a procedure of changing various control operations for respective installation postures of the monitoring camera according to the exemplary embodiment.

FIG. 4 is a flowchart illustrating an example of a procedure of changing various control operations for respective installation postures of monitoring camera 100 according to the exemplary embodiment.

In FIG. 4, in a case where monitoring camera 100 is driven by turning on power (not illustrated in the drawing) (St1), output from triaxial acceleration sensor 39 (that is, pieces of acceleration information of the respective XYZ axis directions) is acquired (St2). CPU 45 detects the installation posture (that is, any one of the upright status, the forward bending status, and the suspension status) of monitoring camera 100 based on the output from triaxial acceleration sensor 39 (St3). CPU 45 converts coordinates, which change an original point position, in order to determine the turning range, which is acquired when the tilt rotation is performed, of the housing (that is, tilt housing 15) of monitoring camera 100 according to the detected installation posture (St4). Accordingly, it is possible for the monitoring camera 100 to appropriately determine a coordination system in the detected installation posture.

Subsequently, CPU 45 performs various control processes (St5). The various control processes are performed within the movable range according to the installation posture.

The control includes change of coordinates through designation of an absolute angle which will be described later, the preset information, the privacy mask, the tilt flip operation, a position, which is acquired when the washer injection is performed, and the like.

In a case where the operation of monitoring camera 100 stops (YES in St6), the process illustrated in FIG. 4 ends.

In contrast, in a case where the operation of monitoring camera 100 is continued (NO in St6), the process of monitoring camera 100 returns to step St2, and processes in steps St2 to St6 are repeated until the operation of monitoring camera 100 stops.

<Setting of Turning Range>

Figure 5:
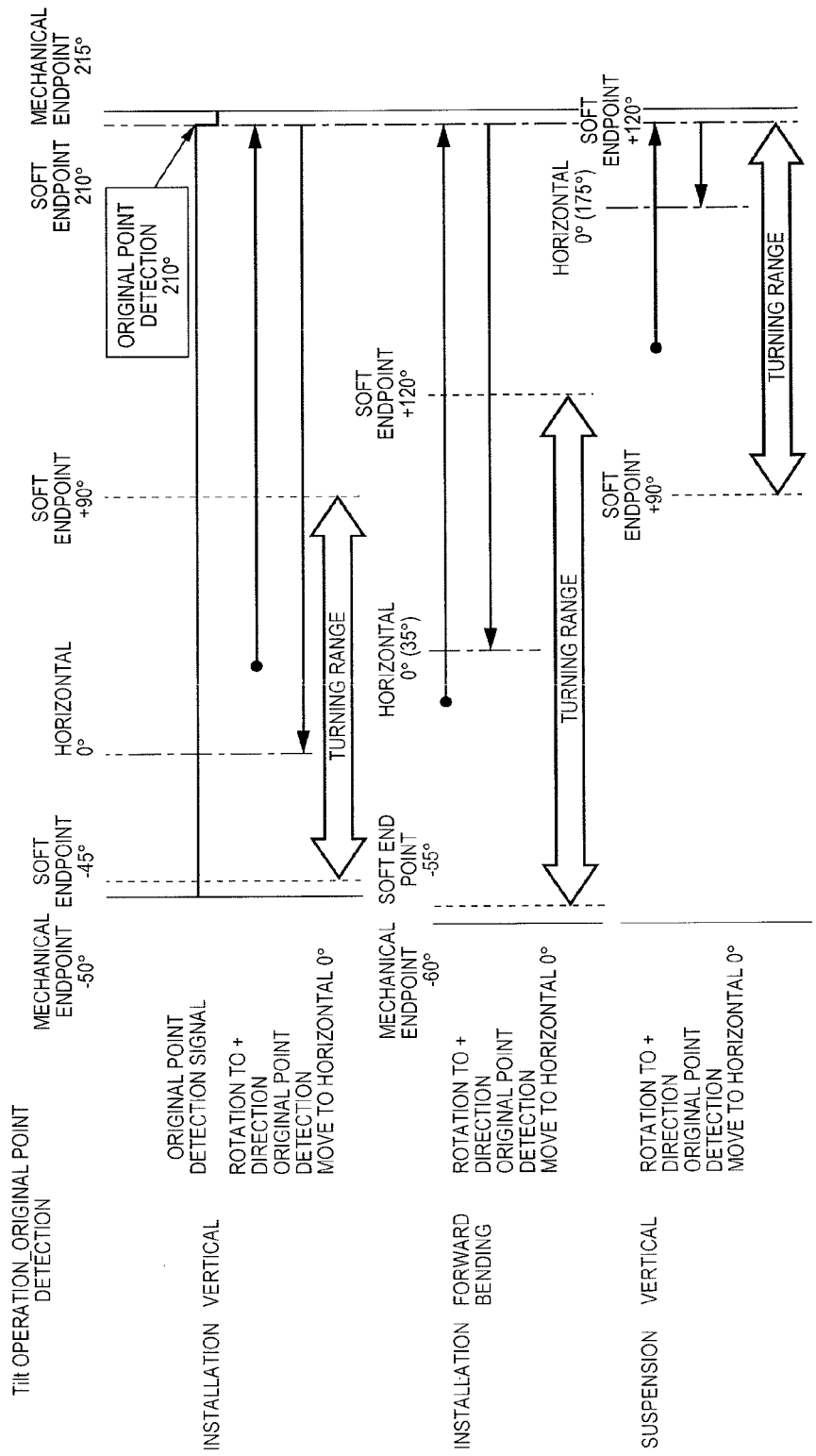
FIG. 5 is an explanatory view illustrating an example of turning ranges which are set for respective installation postures in a tilt operation.
Figure 6:
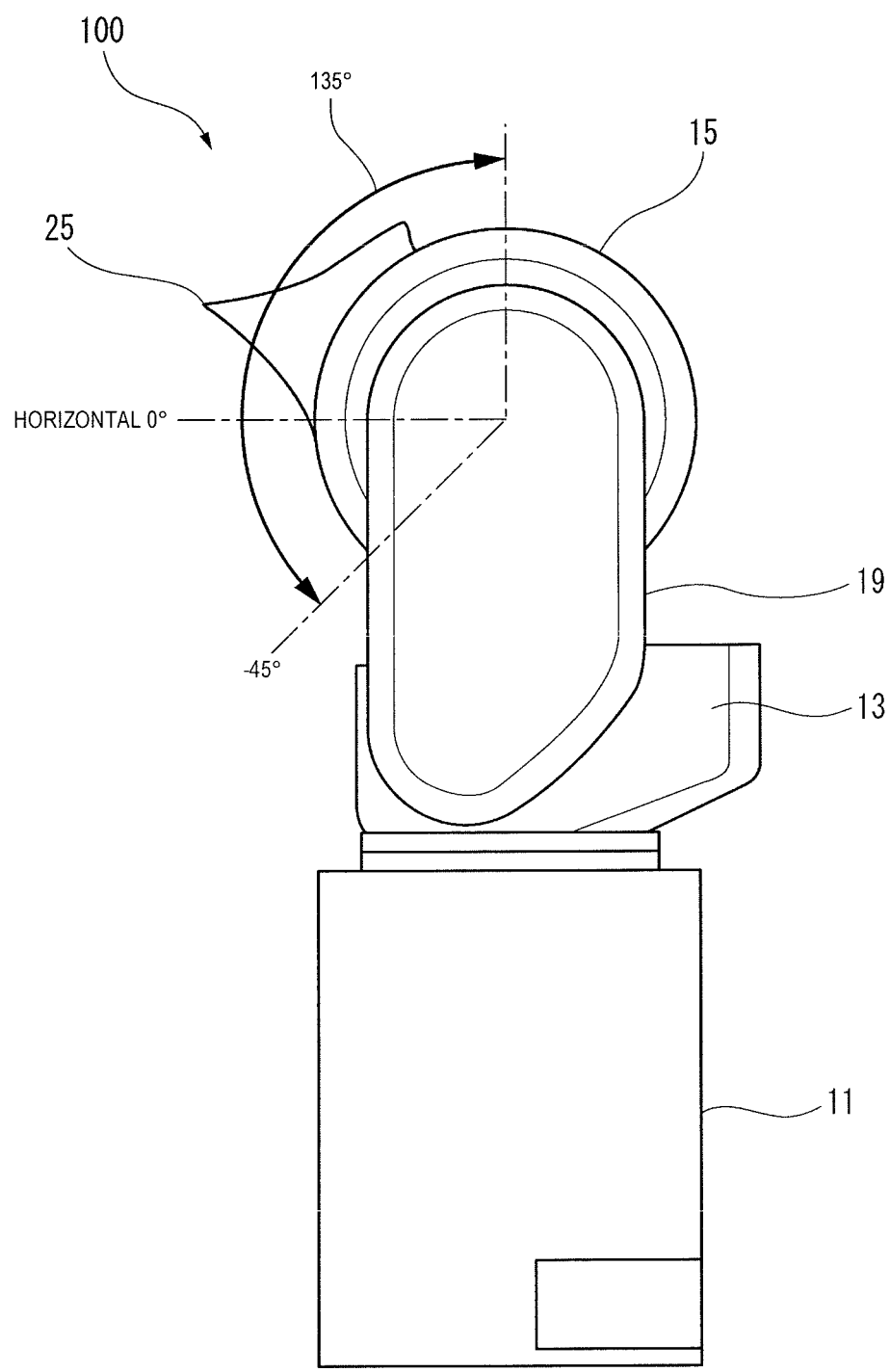
FIG. 6 is a side view illustrating the monitoring camera in an upright posture.
Figure 7:
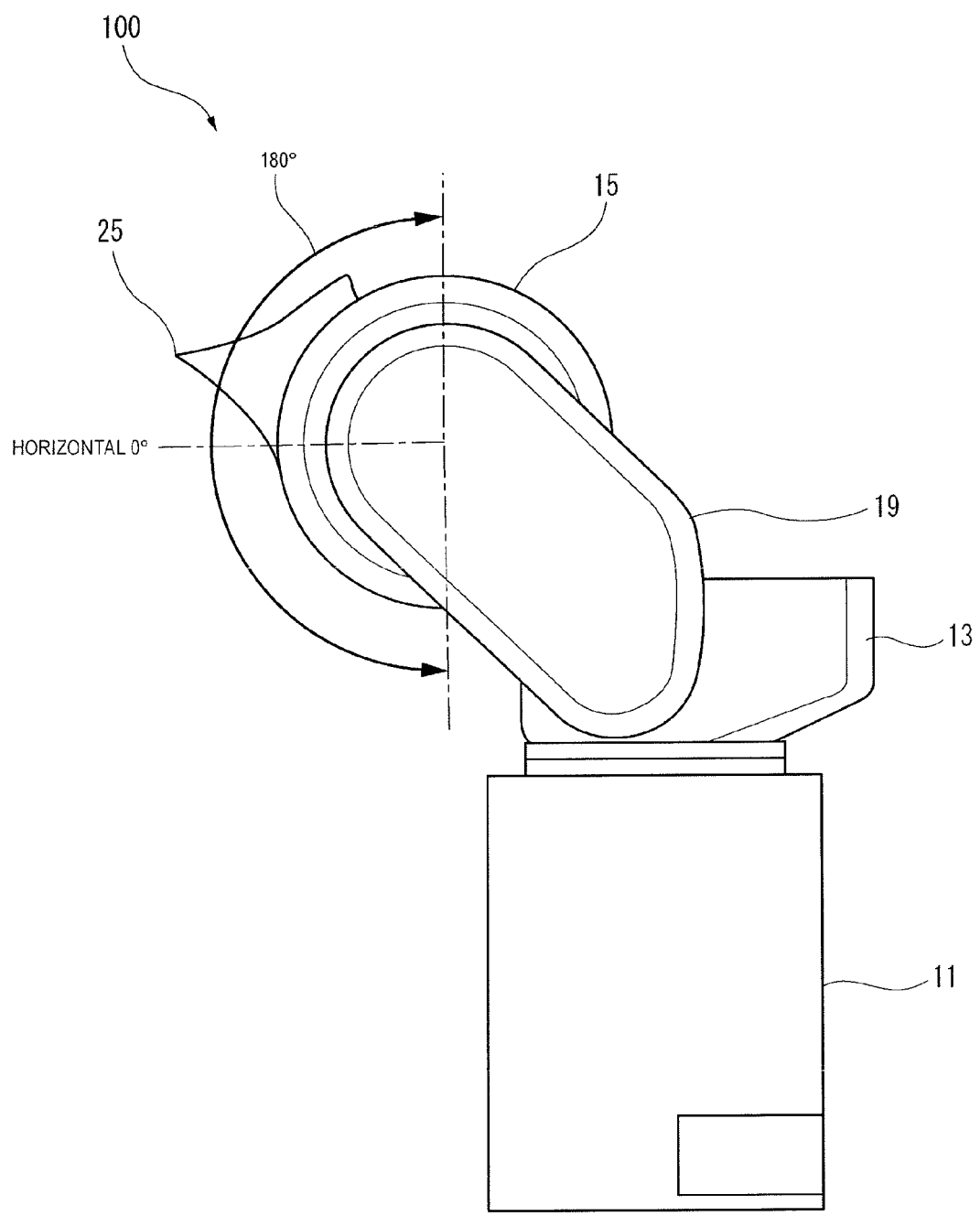
FIG. 7 is a side view illustrating the monitoring camera in a forward bending posture.
Figure 8:
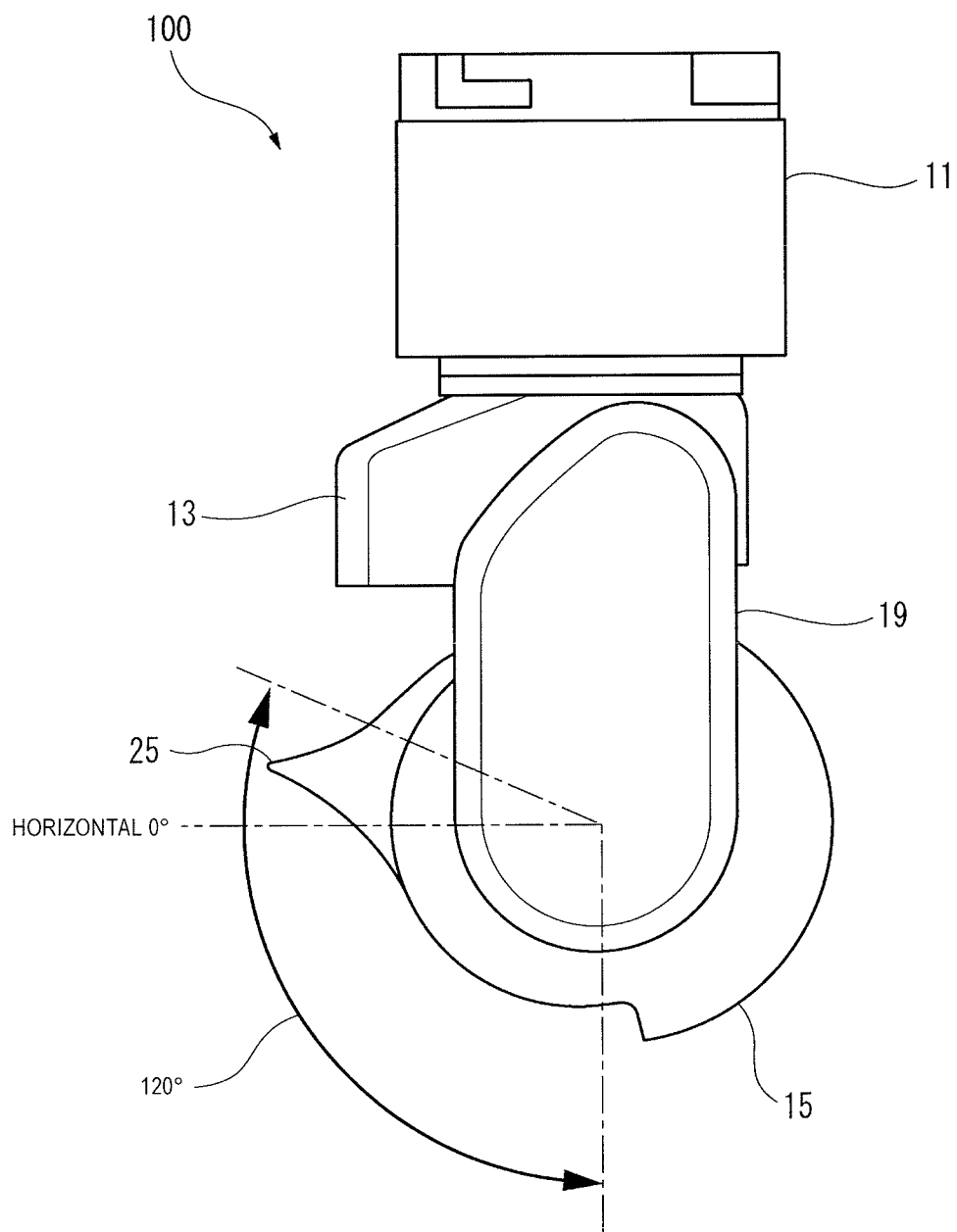
FIG. 8 is a front view illustrating the monitoring camera in a suspension posture.

FIG. 5 is an explanatory view illustrating an example of the turning ranges which are set for respective installation postures in the tilt operation. FIG. 6 is a side view illustrating monitoring camera 100 in an upright posture. FIG. 7 is a side view illustrating monitoring camera 100 in the forward bending posture. FIG. 8 is a front view illustrating monitoring camera 100 in a suspension posture.

CPU 45 of monitoring camera 100 determines the installation posture based on the output (that is, accelerations in the XYZ axis directions) acquired from triaxial acceleration sensor 39, and transmits a start endpoint angle and a terminal endpoint angle of the turning range angle for each installation posture that is read from storage 43 to pan controller 35 and tilt controller 37. Accordingly, monitoring camera 100 is capable of setting the turning range for each installation posture.

specifically, in a case where the upright posture is detected using the output of triaxial acceleration sensor 39, CPU 45 causes tilt housing 15 to perform forward rotation up to the mechanical endpoint (215°). CPU 45 sets a position (210°), which is acquired by performing reverse rotation from the mechanical endpoint by 5°, to a soft endpoint. CPU 45 sets a position, which is acquired by performing reverse rotation from a normal-side soft endpoint by 210°, to an upright "horizontal 0°" (see FIG. 6). Meanwhile, horizontal 0° is a horizontal direction of an appearance to which camera main body 21 is directed, and may be different from an orthogonal direction of an actual vertical direction. CPU 45 sets a position, which is acquired by performing forward rotation from horizontal 0° by 90°, to the normal-side soft endpoint. In addition, CPU 45 sets a position, which is acquired by performing reverse rotation from the horizontal 0° by 45°, to a reverse-side soft endpoint. Meanwhile, the above-described mechanical endpoint (215°) and the reverse-side mechanical endpoint of tilt housing 15 become a position (that is, a position corresponding to −50° from the horizontal 0°) which is acquired by further performing reverse rotation by 5°. Here, CPU 45 sets a range between a soft endpoint of −45° from the horizontal 0° and a soft endpoint of +90° from the horizontal 0° to a tilt turning range of the upright posture (upright status) (see FIG. 6).

In addition, in a case where the forward bending posture is detected using the output of triaxial acceleration sensor 39, CPU 45 sets a position (210°), which is acquired by performing reverse rotation from the mechanical endpoint (215°) by 5°, to the soft endpoint as described above. CPU 45 sets a position, which is acquired by performing forward rotation from the upright horizontal 0° by 35°, to a forward bending "horizontal 0°". Hereinafter, as described above, CPU 45 sets a range between a soft endpoint of −55° and a soft endpoint of +125° to a tilt turning range of the forward bending posture (forward bending status) (see FIG. 7).

In addition, in a case where the suspension posture is detected using the output of triaxial acceleration sensor 39, CPU 45 sets a position (210°), which is acquired by performing reverse rotation from the mechanical endpoint (215°) by 5°, to the soft endpoint as described above. CPU 45 sets a position, which is acquired by performing forward rotation from the upright horizontal 0° by 175°, to a suspension "horizontal 0°". Hereinafter, as described above, CPU 45 sets a range between a soft endpoint of +90° and a soft endpoint of +210° to a tilt turning range of a suspension posture (see FIG. 8).

[B. Change of Angle Coordinate (Angle Offset Using Detected Posture)]

<Change of Movable Range of Tilt (Control Such that Pent-Roof Becomes Top)>

In monitoring camera 100, pent-roof 25 is provided in tilt housing 15. CPU 45 sets a posture of tilt housing 15 such that pent-roof 25 is normally disposed on an upper side (see FIG. 1). For example, in a case where monitoring camera 100 is installed in the suspension status, tilt housing 15 is rotated such that pent-roof 25 becomes the upper side.

<Change of Coordinates Through Designation of Absolute Angle>

Monitoring camera 100 includes the mechanical endpoint as an original point. CPU 45 sets a rotation angle from the mechanical endpoint to an absolute angle. CPU 45 changes coordinates according to each of the installation postures based on the absolute angle. In each of the installation postures, each process is performed based on the changed coordinates.

<Preset Information>

Monitoring camera 100 stores the preset information, which indicates angle information in a predetermined direction viewed from monitoring camera 100, as the preset angle based on the above-described mechanical endpoint (215°) in storage 43. CPU 45 converts the preset angle to a changed preset angle corresponding to each installation posture, and sends out the changed preset angle to pan controller 35 and tilt controller 37 for setting.

<Privacy Mask>

Monitoring camera 100 stores a mask area, in which a part of the image data acquired through imaging of camera main body 21 is not displayed, as a mask range angle based on the above-described mechanical endpoint (215°) in storage 43. CPU 45 converts the mask range angle to a changed mask range angle corresponding to each installation posture, and sends out the changed preset angle to pan controller 35 and tilt controller 37 for setting.

<Tilt Flip Operation>

Figure 9:
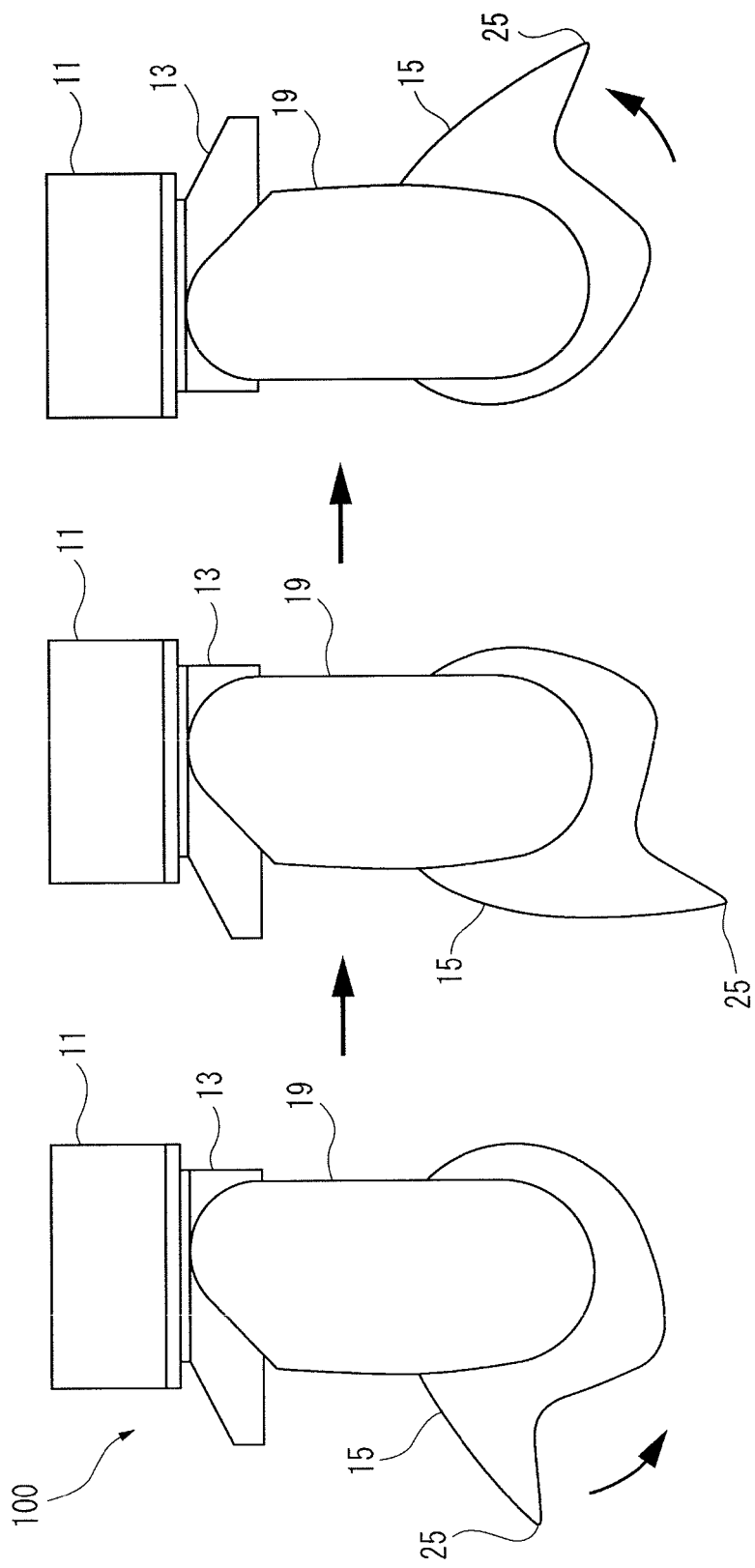
FIG. 9 is a time series explanatory view illustrating a tilt flip operation.

FIG. 9 is a time series explanatory view illustrating the tilt flip operation.

In a case where the installation posture of monitoring camera 100 is the suspension status and a joystick of controller 57 is collapsed downward, camera main body 21 faces directly below, pan housing 13 rotates by 180°, and tilt housing 15 rotates in an upward direction. Accordingly, it is possible to continuously follow a moving subject, which passes directly below, without stopping rotation of tilt housing 15.

<Position in Case of Washer Injection>

Figure 10:
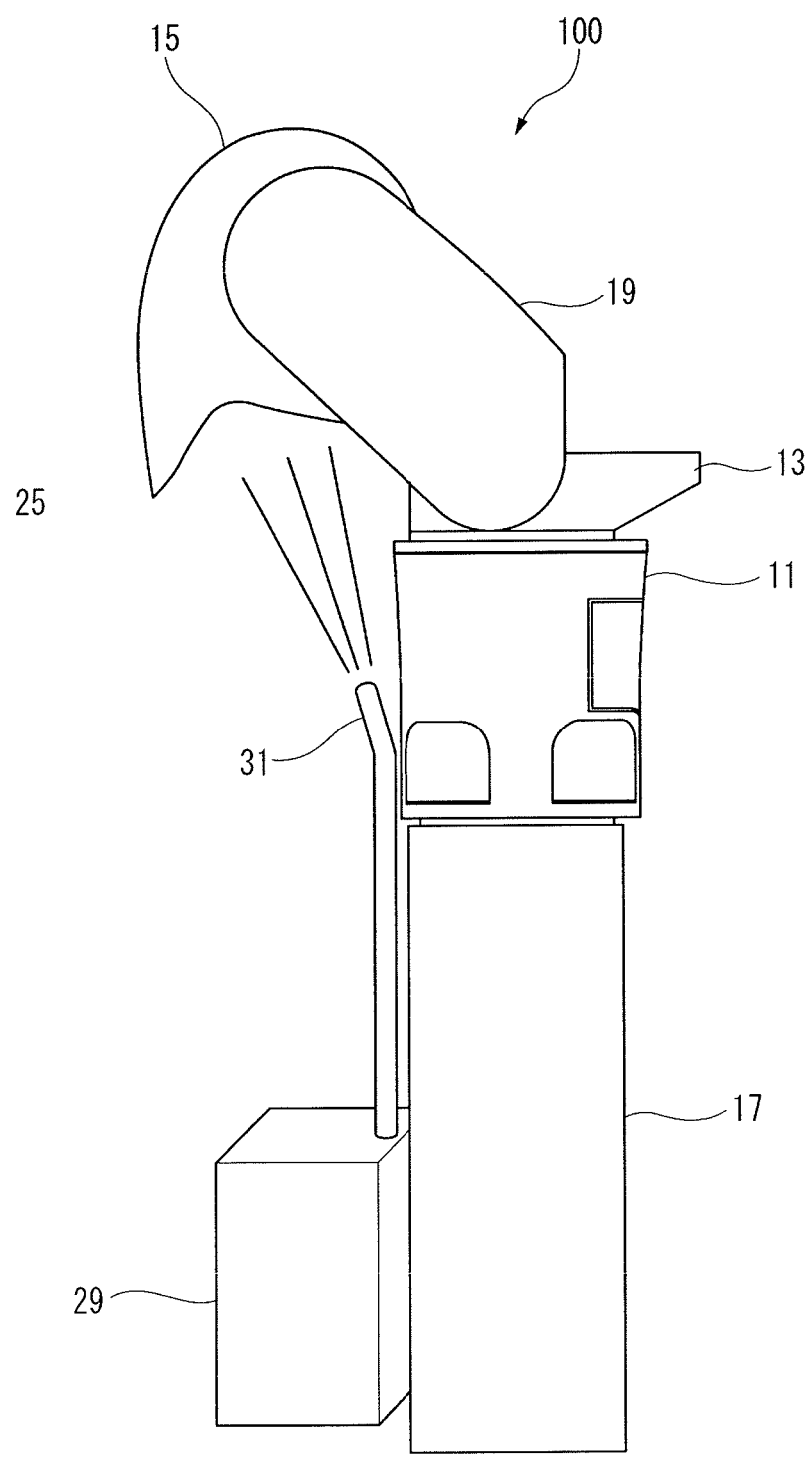
FIG. 10 is a front view illustrating the monitoring camera in which a front cover is disposed in an injection nozzle of the washing water injection device.

FIG. 10 is a front view illustrating monitoring camera 100 in which the front cover is disposed in the injection nozzle of the washing water injection device.

Monitoring camera 100 stores a washing position of front cover 23, which is provided in tilt housing 15, as a washing position angle based on the above-described mechanical endpoint (215°) in storage 43. CPU 45 sends out the washing position angle to pan controller 35 and tilt controller 37 for setting according to a washing manipulation from a user. In a case where washing water injection device 29 (washer) is turned on, CPU 45 controls pan tilt drive device 33 such that front cover 23 of camera main body 21 is disposed in a spurting position of injection nozzle 31 regardless of the installation posture.

Meanwhile, monitoring camera 100 may inject washing water even in a case where the installation posture is any one of the "upright" status and the "suspension" status according to a relative position of injection nozzle 31 and front cover 23.

[C. Restriction of Function or Performance for Each Tilting Status]

<Restriction of Maximum Speed>

In cases of a normal operation, pan rotation, and tilt rotation, monitoring camera 100 restricts a maximum rotation speed. The maximum rotation speed is restricted by suppressing, for example, electric power supplied to each of pan motor 47 and tilt motor 49.

<Restriction of Durability to Wind Speed>

In the case of the normal operation, monitoring camera 100 restricts durability to a wind speed. The durability to a wind speed is restricted by suppressing, for example, electric power to be supplied to each of pan motor 47 and tilt motor 49. In contrast, in a case where resistance increases due to wind, CPU 45 relaxes or releases the restriction. That is, CPU 45 increases the rotation torque of the motor by increasing electric power to be supplied to each of pan motor 47 and tilt motor 49. Accordingly, monitoring camera 100 is capable of rotating while resisting against large external force due to wind. CPU 45 determines the release of the restriction of the electric power based on the installation posture of monitoring camera 100. For example, in the forward bending installation posture which is easily affected by wind, the restriction of power is initially released.

[D. Absolute Position Information which is Returned to Controller Side]

Figure 11:
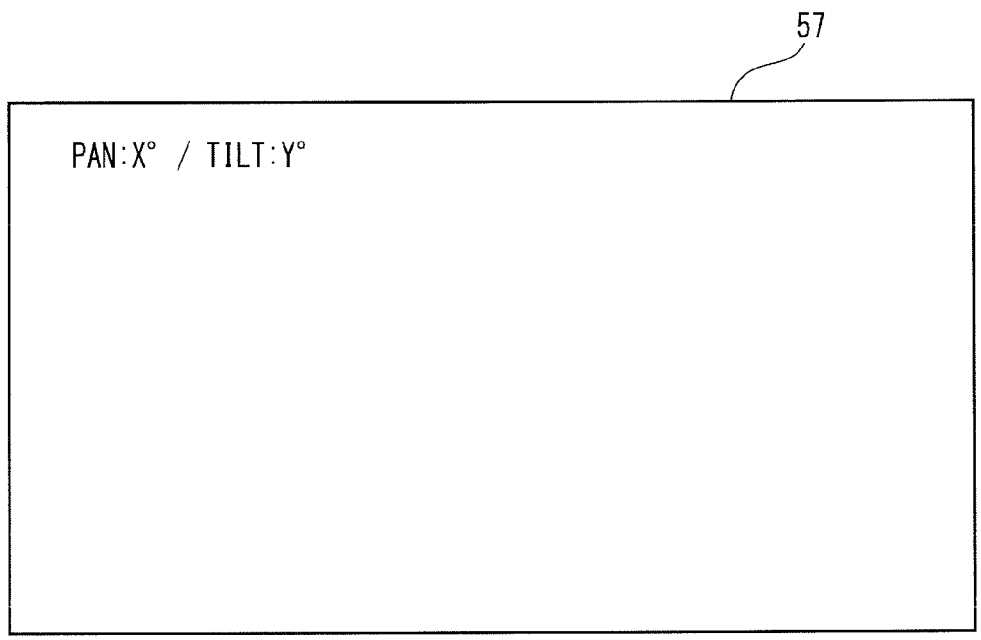
FIG. 11 is an explanatory view illustrating a display screen on which angle information is displayed.

FIG. 11 is an explanatory view illustrating a display screen on which the angle information is displayed. The display screen is displayed in a monitor (not illustrated in the drawing) as, for example, a browser screen of controller 57.

Monitoring camera 100 displays the absolute position information (absolute angle) on controller 57. CPU 45 converts the absolute position information based on the installation posture, and displays the absolute position information acquired through the conversion. Accordingly, even though the installation posture of monitoring camera 100 is changed, it is possible for the user to accurately grasp the angle information which defines the absolute position information according to an installation posture acquired after the change.

Subsequently, an effect of the above-described configuration will be described.

In a case where power is turned on in monitoring camera 100 according to the exemplary embodiment, pan motor 47 and tilt motor 49 operate, and pan housing 13 and tilt housing 15 rotate. In a case where pan housing 13 rotates up to the mechanical endpoint, mechanical endpoint detection sensor 41 outputs the mechanical endpoint detection signal in a pan direction. In a case where CPU 45 receives the mechanical endpoint detection signal in the pan direction, CPU 45 stops pan motor 47. Simultaneously, CPU 45 sets a pan rotation angle to 0. In the same manner, CPU 45 also sets a tilt rotation angle to 0.

Triaxial acceleration sensor 39 detects accelerations in the XYZ axis directions, which enable an installation posture of any one of upright, forward bending, and suspension to be detected, and outputs the detected accelerations to CPU 45. CPU 45 detects the installation posture of monitoring camera 100 based on acceleration information acquired from triaxial acceleration sensor 39. CPU 45 reads the turning range angle according to the detected installation posture from storage 43.

CPU 45 sends out the start endpoint angle and the terminal endpoint angle of the read turning range angle to pan controller 35 and tilt controller 37 for setting. Pan controller 35 and tilt controller 37 causes, for example, tilt motor 49 to turn tilt housing 15 in a range between a start endpoint angle and a terminal endpoint angle received from CPU 45. That is, even though the installation posture is changed, monitoring camera 100 is capable of controlling the operation of tilt housing 15 at the turning range angle according to each installation posture. Therefore, according to monitoring camera 100 according to the exemplary embodiment, the turning range in a case where the housing is rotated is determined according to the housing posture (for example, tilt housing 15) of the installed monitoring camera 100, the turning range is automatically switched, and thus it is possible to improve user convenience.

In addition, in monitoring camera 100, storage 43 stores the preset information as the preset angle from the mechanical endpoint (215°). The preset information is a pan tilt angle (that is, preset angle) in a direction that the user wishes to see. Whenever a new installation posture is detected according to the output from triaxial acceleration sensor 39, CPU 45 converts the preset angle according to the installation posture and acquires the changed preset angle. CPU 45 sends out the changed preset angle to pan controller 35 and tilt controller 37 for setting.

Accordingly, even though the user stores the preset information in, for example, the upright status and then the installation posture is changed to the suspension status, the preset angle in the upright status is automatically converted into the changed preset angle in the suspension status in the monitoring camera 100. Accordingly, even though the installation posture of monitoring camera 100 is changed, the user can save labor to set new preset information again.

In addition, in monitoring camera 100, storage 43 stores a mask area, to which a privacy mask is applied, as the mask range angle from the mechanical endpoint (215°). The mask area is an area in which a part of the image data of the subject acquired through imaging is not displayed. Whenever a new installation posture is detected according to the output from triaxial acceleration sensor 39, CPU 45 converts the mask range angle according to the installation posture and acquires the changed mask range angle. CPU 45 sends out the changed mask range angle to pan controller 35 and tilt controller 37 for setting.

Accordingly, even though the user stores the mask area in, for example, the upright status and then the installation posture is changed to the suspension status, the mask area in the upright status is automatically converted into the changed mask range angle in the suspension status in the monitoring camera 100. Accordingly, even though the installation posture of monitoring camera 100 is changed, the user can save labor to set new mask area again.

Furthermore, in monitoring camera 100, storage 43 stores the washing position of front cover 23, which is provided in tilt housing 15 of camera main body 21, as the washing position angle from the mechanical endpoint (215°). The washing position is a position (direction) of tilt housing 15 in which injected water of washing water injection device 29 is applied to a lens of camera main body 21 or front cover 23. CPU 45 sends out the washing position angle to pan controller 35 and tilt controller 37 for setting regardless of the installation posture according to, for example, the washing manipulation from the user who uses controller 57.

Accordingly, it is always possible to apply washing water to front cover 23 in an optimal washing position (the relative position of front cover 23 and injection nozzle 31) even in a case where the user uses the monitoring camera 100 in an arbitrary installation posture.

Hereinabove, although various exemplary embodiments are described with reference to the drawings, it is apparent that the present disclosure is not limited to the examples. It is apparent that those skilled in the art may arrive various changed examples or modified examples within a category disclosed in the scope of the claims, and it is understood that those changed examples or modified examples naturally belong to the technical scope of the present disclosure.

For example, although a case where monitoring camera 100 includes two tilt motors 49 in order to acquire the forward bending posture is described in the above configuration example, the configuration of monitoring camera 100 according to the exemplary embodiment may be configured such that tilt motor 49 of the first tilt rotator is omitted and an angle of the first tilt rotator is manually set. Accordingly, it is possible to simplify a mechanism of the monitoring camera and to make a product cost be inexpensive.

The present disclosure is useful as a camera apparatus that detects an original point for determining a turning range in a case where housing is rotated according to a posture of an installed housing, and automatically switches the turning range capable of shielding incidence of light from outside, such as light of sun, based on the original point, thereby improving user convenience.

What is claimed is:

1. A camera apparatus comprising:
   a pan rotation driver that is supported by a housing main body, and is configured to perform pan rotation by a pan motor;
   a tilt rotation driver that is configured to include a capture, is supported by the pan rotation driver through an arm, and is configured to perform tilt rotation by a tilt motor;
   a pan controller that controls a pan rotation angle of the pan rotation driver;
   a tilt controller that controls a tilt rotation angle of the tilt rotation driver;
   a position detection sensor that detects an endpoint of a physical rotation direction of the tilt rotation driver;
   a storage that stores a turning range in a tilt rotation direction for each posture as an angle which indicates the turning range from the endpoint; and
   a controller that controls the tilt rotation angle by sending out a start endpoint angle and a terminal endpoint angle of the angle, which indicates the turning range stored in the storage, to the tilt controller according to the posture of the tilt rotation driver.

2. The camera apparatus of claim 1,
   wherein the storage stores preset information, which indicates angle information of a predetermined direction viewed from the camera apparatus, as a preset angle based on the endpoint, and
   wherein the controller converts the preset angle into a changed preset angle corresponding to each posture, and sends out the changed preset angle to the pan controller and the tilt controller for setting.

3. The camera apparatus of claim 1,
   wherein the storage stores a mask area, which is used such that a part of image data imaged by the capture is not displayed, as a mask range angle based on the endpoint, and
   wherein the controller converts the mask range angle into a changed mask range angle corresponding to each posture, and sends out the changed mask range angle to the pan controller and the tilt controller for setting.

4. The camera apparatus of claim 1, further comprising:
   a washing water injection device that washes a front cover of the tilt rotation driver,
   wherein the storage stores a washing position of the front cover of the tilt rotation driver, which is washed by the washing water injection device, as a washing position angle based on the endpoint, and
   wherein the controller sends out the washing position angle to the pan controller and the tilt controller for setting according to a washing manipulation from a user.

* * * * *